Figure 1:
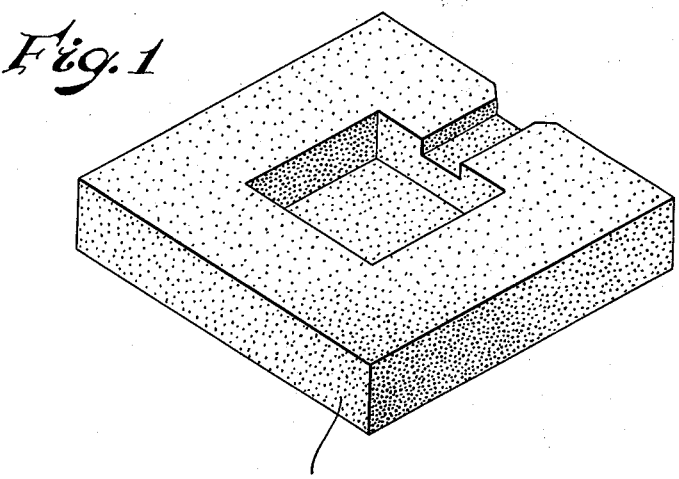

Oct. 8, 1963

W. L. ARCHER 3,106,542

RESIN-PROVIDING COMPOSITIONS

Filed May 6, 1957

Shell mold fabricated with cross-linked resin binder comprised of coal acids and polyfunctional amine or alcamine adduct Glass fiber mat bonded with cross-linked resin binder comprised of coal acids and polyfunctional amine or alcamine adduct INVENTOR.
Wesley Lee Archer
BY Griswold & Burdick
ATTORNEYS

United States Patent Office

3,106,542
Patented Oct. 8, 1963

3,106,542
RESIN-PROVIDING COMPOSITIONS
Wesley L. Archer, Midland, Mich., assignor to The Dow Chemical Company, Midland, Mich., a corporation of Delaware
Filed May 6, 1957, Ser. No. 657,127
13 Claims. (Cl. 260—37)

The chief aim and concern of the present invention is to furnish novel and utile resin-providing compositions that are comprised of particular varieties of reaction products or adducts of various alcamines, polyamines or their mixtures with coal acids or their halogenated derivatives, which compositions have free and uncombined functional terminal groups in their structures that are easily available for reaction and which are well adapted to being cross-linked with any of several polyfunctional cross-linking reagents to resinous products that may be cured and either completely thermoset or more or less thermoplastic in nature. It is also among the designs and objectives of the invention to contribute to the art the indicated types of cross-linked resinous products from said reactive coal acids adducts and mono- or polyfunctional cross-linking reagents, which products have a pronounced utility for being employed with great advantage in an adhesive capacity or as a resin binder material, or both, for any of a great number of inert filler substances or for the lamination of various structures. The invention also relates and has for a purpose the provision of integral formed composite structures that may be prepared with the aforementioned cross-linked compositions.

According to the present invention, the mentioned and cognate ends are readily and advantageously achieved in and with a resin-providing, cross-linkable composition that is comprised of a reaction product or adduct of about one molecular weight of an alcamine (which advantageously may be an alkanolamine) or polyamine or a mixture of such polyfunctional compounds with each equivalent weight of a mixture of the polycarboxylic acids that may be obtained from the oxidation of coal and the like carbonaceous materials which, for convenience, are hereinafter referred to as coal acids. The reaction products or adducts that are so obtained have a plurality of functional terminal groups which, depending upon the particular polyfunctional compound that is employed in their preparation, may be either of the free hydroxyl or free amine type, or both. The compositions may thus be cross-linked with any mono- or polyfunctional reagent that is capable of reacting with hydroxyl or amine groups, or both, to provide resinous products of great diversity and usefulness.

The cross-linkable, functional terminal group-containing coal acids adduct may advantageously be prepared in a suitable solvent medium for the reactant materials such as in water, low molecular weight aliphatic alcohols (including methanol and ethanol) and the like polar, relatively low boiling solvent liquids. The reaction between the coal acids and the alcamine or polyamine or mixture thereof in the respective indicated equivalent to molecular weight ratio may be accomplished at normal room temperatures or at elevated temperatures, depending upon the degree of water solubility that is desired in the resin-providing composition, and, to some extent, upon the manner in which it is intended to be utilized for formation of the ultimate cross-linked resin products that may be derived therefrom. When the reaction is performed at room temperatures, the adduct is generally found to be a completely water soluble substance that is formed with amine salt linkages between the reactant ingredients. When formed at elevated temperatures up to about 400–450° F., the adduct usually has decreased water solubility to the point of being only partially soluble in water due to the conversion of most of the functional group in the alcamine or polyamine reactant to amide and, in the cases where alcamine or alkanolamine reactants are employed, some ester linkages in the resin-providing composition. In either event, the reaction-product or adduct is formed with functional terminal groups that may be cross-linked in order to provide highly advantageous resin products.

After their preparation, the reaction products or adducts of the coal acids and alcamines or polyamines may be isolated from solution or partial solution in the reaction mass (depending on whether they have been prepared as amine salts or as amide or amine and ester linked products) and recovered. The cross-linkable reaction products that are so obtained are solids whose appearances may range from that of crystalline structures to somewhat glassy appearing substances. In many instances, however, particularly when the adducts are soluble in water or in another solvent medium in which they are prepared, they may be utilized for subsequent application directly in the vehicle in which they were formed. The cross-linkable adducts are generally neutral or slightly basic in nature, depending upon the character of the free functional terminal groups that are available therein.

The coal acids adducts, after their initial preparation, may be cross-linked with any reagent that is capable of reacting with free hydroxyl or amine groups. Usually only a minor proportion of the cross-linking reagent is necessary to provide the cross-linked resin product. Thus, from 5 to 50 percent by weight of the reagent, based on the weight of the adduct, is generally adequate for the cross-linking purpose. Frequently, an amount of the cross-linking reagent that is between about 10 and 25 percent by weight, based on the weight of the adduct, may be employed with advantage. If precision is desired, the exact quantity of the cross-linking reagent for accomplishment of the intended purpose can be calculated and employed in any given instance. As indicated, the cross-linking reagent may be mono- or polyfunctional, provided it is capable of a cross-linking reaction with the terminal hydroxyl or amine groups. Advantageously, the cross-linking reagent may be an aldehyde type of material such as furfural or glyoxal and the like, or a urea-formaldehyde condensate of the usual resin precursor variety, i.e., mono- or dimethylolurea and the like. Alternatively, an isocyanate or polyisocyanate material may be utilized as a cross-linking reagent to give a typical urethane structure in the cross-linked resin product as may various epoxy (or oxirane) group-containing reagents. It is generally desirable to employ relatively low molecular weight compounds of any particular type as the cross-linking reagent for the coal acids adduct.

The cross-linked resin products may be obtained as thermoplastic or partially thermoplastic substances or as highly cured thermoset materials, depending upon the quantity of cross-linking reagent that is employed and the curing or cross-linking temperature that is utilized for the purpose. The use of more moderate cross-linking temperatures, say in the neighborhood of 200–300° F. (taken as the actual resin temperature), usually produces a resin product that, at least initially, is thermoplastic and relatively fusible but which gradually becomes thermoset upon continued heating. Higher cross-linking temperatures as from 300 to 500° F. ordinarily cause a completely cured and thermoset resin product to be obtained from the cross-linked coal acids adduct.

Composite structures may be prepared with great benefit by mixing or compounding one of the coal acids adduct and a suitable quantity of a desired cross-linking reagent with a desired inert filler substance and subsequently subjecting the mixture to a cross-linking temperature for the intimately associated adduct and reagent. For this purpose, the cross-linkable coal acids adduct or reaction product may be employed as an isolated solid for mixture with the cross-linking reagent and the inert filler or, frequently with great advantage, it may be compounded while it remains in solution or partial solution in the vehicle in which it was prepared. Of course, an already prepared and isolated adduct may also be dissolved or dispersed in any desired, preferably non-reactive, vehicle for purposes of compounding. After compounding the liquid dispersed mixture of the coal acids adduct and the cross-linking reagent therefor with the filler (or the liquid dispersion of the adduct alone with a mixture of the desired cross-linking reagent and filler), the wet mixture may be dried and cross-linked by exposure to heat at elevated temperatures to a cross-linked and preferably thermoset structure in which the resin product at least partially envelops and binds together or coalesces the inert filler. Any of the indicated methods or techniques of wet mixing are oftentimes highly desirable, for example, when glass fibers are being bound into mats and the like and for preparing refractory compositions with said and equivalent inert fillers.

While requirements may vary when preparing composite structures with individual inert filler substances and in other applications, it is usually desirable for many purposes to employ a sufficient quantity of the cross-linked resin product to ensure, upon finishing of the formulated composition as a composite structure, that between about 2 and 15 percent by weight of the resin product, based on the weight of the formulated composition, is present in the resin structure. However, for some purposes (according to conventional practices), much more of the resin may be required. Thus, when such fillers as wood flour are used or when certain fiber reinforced plastic structures are being fabricated, a major proportion of the composite structure, as in the neighborhood of 50 to 70 or more percent by weight, may advantageously consist of the resin product binder. Of course, the resin products of the invention may be employed without fillers in order to provide various shaped and molded articles or for furnishing protective coatings that may be of the baked-on variety wherein the mixture of the coal acids adduct and the cross-linking reagent is cured or thermoset in situ after having been deposited as a coating on or over any surface intended to be protected.

The mixture of the cross-linkable coal acids adduct of the present invention with the cross-linking or curing reagent therefor may usually be cross-linked, ordinarily to completely cured and thermoset resin products, at employed temperatures or in curing atmospheres having temperatures between about 300° F. and 1200° F. for periods of time between about several seconds and several hours depending, as will be appreciated by those skilled in the art, upon the particular configuration and composition that is involved. Usually (and frequently necessarily) the thermosetting or curing times that are required are inversely proportional to the temperature that is utilized. The coal acids adducts of the invention, as a general rule, can be satisfactorily cross-linked by the cross-linking reagent that is mixed therewith by heating them to an actual resin temperature (as has been mentioned) between about 300 and 500° F. for periods of time between 10 seconds or less and an hour or more, depending on the particular heating techniques that are involved and the heat exchanging efficiencies that are realized. Besides the more conventional means for heating, the mixtures of the resin-providing adduct compositions and the cross-linking reagents may also be cured suitably under the influence of dielectric heating. In this connection, the cross-linking or curing temperatures that are involved in the practice of the present invention are usually lower than those that must be employed for coal acids adducts with alcamines or polyamines that are self-curing upon exposure to heat at elevated temperatures and which are comprised of reacted proportions of either poly-functional reactant that are maintained at less than about 2:1 equivalent parts ratio, such as are disclosed by the present inventor and others on the copending applications having Serial Nos. 629,669 and 629,569 which were both filed on December 29, 1956, now United States Patents Numbers 2,895,936 and 2,895,934, respectively.

Figure 2:
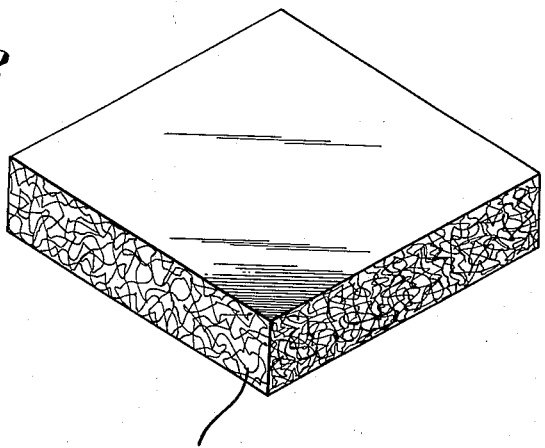

Although, as has been indicated, the cross-linked, resin-providing coal acid adducts of the present invention are adapted to be utilized in and of themselves in the preparation of moldings and other shaped articles, they are, as has been indicated, especially desirable for employment in or as cross-linkable adhesives, binders, molding powders, fillers and the like in which capacity they may be utilized independently or in combination with other ingredients. Thus, they may be employed with great benefit as the adhesive ingredient in the production of ply-wood and similar laminate articles of construction. Particular benefit, as mentioned, may be derived when the cross-linkable formulations of the aducts are employed as binders for the preparation of composite structures from various inert filler substances including silicious fillers, carbonaceous fillers (such as graphite, coke breeze, powdered coal and the like) and relatively analogous fillers including mineral and synthetic fibers, asbestos, fly ash, various blast furnace and powerhouse slags, mica flour, wood flour and the like fibrous or granular substances that are substantially inert to the resin-providing compositions and do not melt, fuse excessively or decompose at the curing temperatures which may be involved in the fabrication of the desired composite structures. Exceptional advantages are involved when such inert silicious filler substances as glass fibers and sand are bonded together with the cross-linked coal acids adducts of the invention. One of the halves of a shell mold prepared from a sand composition coated with a cross-linkable formulation of a coal acids adduct in accordance with the invention is illustrated in FIGURE 1 of the accompanying drawing. A mat of glass fibers bound together with a cured and cross-linked resin from a coal acid adduct of the invention is depicted in FIGURE 2 of the drawing.

The coal acids that are employed to prepare the resin-providing adducts of the invention may be identical with or similar to those which may be obtained by the oxidation with gaseous oxygen, which may be contained in the air, of an aqueous alkaline slurry of a finely divided carbonaceous material selected from the group consisting of coal and coke that has been obtained by the carbonization of coal at temperatures beneath about 1300° F. Coal acids that have been prepared by the nitric acid oxidation of suitable carbonaceous materials are also generally satisfactory. Such coals that are of the varieties known as anthracite, bituminous, sub-bituminous and lignite and other low grade coals are generally suitable for production of coal acids. Satisfactory cokes are those produced according to conventional techniques from coal at a temperature beneath about 1300° F. The utilization of higher coking temperatures frequently causes the cokes that are obtained to be graphitic and rendered unsuitable for conversion to coal acids in satisfactory yields.

The free coal acids product is a hygroscopic, usually yellowish, essentially water-soluble material that is believed to be substantially comprised of various aromatic polycarboxylic acids. The average molecular weight of the coal acids that are ordinarily obtained is frequently in the neighborhood of 250. Their average equivalent weight is generally about 80 and seldom less than 75 or more than 90. They ordinarily appear to have an average of 2.5 to 5 carboxylic groups per molecule with an apparent average of 3 to 4 being common. While their exact chemical nature and constitution may be somewhat conjectural, they evidently contain considerable quantities of tri- and tetra-carboxylic benzene acids as well as aromatic acids having more complex nuclei. Frequently, for example, the greatly preponderant proportion of aromatic nuclei obtained in coal acids prepared in the described fashion have been found to consist of methylnaphthalene, benzene, biphenyl, naphthalene, phenanthrene, alkyl benzene, benzophenone and toluene nuclei.

Practically any aliphatic or alicyclic polyfunctional compound that contains either amine and hydroxyl groups in combination or a plurality of amine groups in the same molecule may be employed for preparation of the cross-linkable, functional terminal group-containing coal acid adducts of the invention.

Thus, the polyfunctional amine compounds that may be employed in the practice of the invention to prepare the adducts may advantageously be selected from the group of polyamines that are represented by either of the formulae $H_2N-G-NH_2$ and $$H_2N-(GNH-G)_n-NH_2$$

wherein G may be any $C_2$ to $C_{10}$ aliphatic or $C_6$ to $C_{14}$ aromatic radical and $n$ is a whole integer. Other functionally equivalent polyamine compounds such as piperazine and the various substituted piperazines and melamine, in which the nitrogen atoms are part of a heterocyclic molecular structure, may also be utilized. When polyamines are employed, it is generally an advantage to utilize relatively low molecular weight members of such type of poly-functional compounds for the preparation of the coal acids adducts. Polyamines that may be included in this more economical category include hexamethylene diamine, hexamethylene tetramine, ethylene diamine, diethylene triamine, triethylene tetramine and the like.

Likewise, alcamine compounds which may be employed may be any aliphatic or alicyclic alkanolamine (which may also have aromatic nuclei in its molecular arrangement) that contains at least one amine group (preferably a secondary amine group) and at least one hydroxyl group in its molecule. Beneficially, the alcamine compounds that are utilized to react with the coal acids to form both ester and amide linkages in the thermosetting adducts and cured resins are selected from the group of such compounds that are represented by either of the formulae: $H_2N-R-OH$; $HO-R-NH-R-OH$; $(HOR)_3N$ and the like and analogous structures wherein each R may independently be any $C_2$ to $C_{12}$ aliphatic radical. Other functionally equivalent polyfunctional alcamine compounds may also be utilized. In the interests of economy, it is also generally an advantage to employ relatively low molecular weight aliphatic alcamines or polyglycol polyamines for the preparation of the coal acids adducts. Alcamines that may be particularly included in this category include mono-, di- and tri-ethanolamine and mixtures thereof, propanolamine, butanolamine and the like monoamine and polyamine compounds containing one or more reactive hydroxyl groups.

By way of further illustration, a functional terminal group-containing coal acids adduct was prepared by dissolving about 164 grams (2 equivalent weights) of coal acids, having an average molecular weight of about 250, in about 200 milliliters of water at the boil to which solution was added, with continued efficient mixing about 210 grams (2 molecular weights—containing 2 equivalents of amino groups) of diethanolamine. The aqueous solvent was then distilled off and the reaction mass heated to a temperature between about 375 and 400° F. that was sufficient to carry out the amide linking reaction in the adduct. The reaction mass was held at this temperature for about two hours, during which time approximately 75 percent of the theoretical amount of water from the amide formation was distilled over. During the last stages of the reaction, the reaction mass became very viscous and difficult to stir. After termination of the reaction, the reaction mass was cooled with an accompanying application of vacuum in order to foam the product to assist in its removal from the reaction vessel and to facilitate removal of all vestigal traces of water. The cooled product was then ball milled to yield a water soluble tan powder. Upon titration with a standard solution of a sodium hydroxide, the product showed that there had been about a 75 percent conversion from amine salt to amide.

About 10 grams of the coal acids/diethanolamine adduct was mixed with about 5 grams of 2-furfural to provide an exothermic reaction and a solution of increasing viscosity. Under moderate temperatures of 2 to 300° F. a thermoplastic resin product was quickly formed which gradually, after about thirty minutes exposure at the same temperature, formed a completely cured and thermoset material.

In a manner similar to the foregoing, analogous adducts were prepared from one mole of diisopropanol amine and one equivalent of coal acids. The cross-linkable products, when mixed with the cross-linking reagent, were formulated with sand prior to being subjected to the curing temperature in order to provide excellent, resin-bonded composite structures. Very satisfactory results were also obtained when the coal acids adduct was prepared at room temperature and then cross-linked by mixture with the cross-linking reagent without first converting most of the amine salt to amide linkages. Good filled structures were also obtained by using a non-converted coal acids adduct of this type.

What is claimed is:

1. Resin providing, cross-linkable composition comprised of (1) an adduct of about 1 molecular weight of a polyfunctional compound selected from the group consisting of alcamines of the formulae $H_2N-R-OH$; $HO-R-NH-R-OH$; and $(HOR)_3N$ in which each R is independently a $C_2$ to $C_{12}$ aliphatic radical, polyamines of the formulae $H_2N-G-NH_2$ and $$H_2N-(GNH-G)_n-NH_2$$

in which G is independently taken from the class consisting of $C_2$ to $C_{10}$ aliphatic and $C_6$ to $C_{14}$ aromatic radicals; piperazine, melamine; and mixtures thereof with each equivalent weight of a mixture of coal acids which are the water soluble mixed aromatic polycarboxylic acids that are the product of the oxidation of coal and the like carbonaceous materials, which coal acids have an average molecular weight of about 250, an average equivalent weight between about 75 and 90, and contain an average of from about 2.5 to 5 carboxylic groups per aromatic nucleus in their molecule and (2) a minor proportion of between about 5 and 50 weight percent, based on the weight of the composition of a cross-linking reagent that is capable of reacting with hydroxyl and amine groups when heated to a resin temperature between about 300° F. and 500° F., said cross-linking reagent being selected from the group consisting of aldehydes, monomethylolurea, dimethylolurea, isocyanates, and mixtures thereof.

2. The composition of claim 1 wherein the polyfunctional compound is monoethanolamine.

3. The composition of claim 1 wherein the polyfunctional compound is diethanolamine.

4. The composition of claim 1 wherein the polyfunctional compound is diisopropanol amine.

5. The composition of claim 1 wherein the polyfunctional compound is ethylenediamine.

6. The composition of claim 1 wherein the polyfunctional compound is diethylenetriamine.

7. The composition of claim 1 containing between about 10 and 25 percent by weight of said cross-linking reagent.

8. A cross-linked resinous product comprising a cured composition in accordance with the composition set forth in claim 1.

9. Cross-linkable mass for forming integral composite structures consisting of an inert filler substance blended with at least about 2 weight percent, based on the weight of the mass, of a resin-providing composition comprised of (1) an adduct of about 1 molecular weight of a polyfunctional compound selected from the group consisting of alcamines of the formulae $H_2N—R—OH$;

$$HO—R—NH—R—OH$$

and $(HOR)_3N$ in which each R is independently a $C_2$ to $C_{12}$ aliphatic radical, polyamines of the formula $$H_2N—G—NH_2 \text{ and } H_2N—(GNH—G)_n—NH_2$$

in which each G is independently taken from the class consisting of $C_2$ to $C_{10}$ aliphatic and $C_6$ to $C_{14}$ aromatic radicals; piperazine, melamine; and mixtures thereof with each equivalent weight of a mixture of coal acids which are the water soluble mixed aromatic polycarboxylic acids that are the product of the oxidation of coal and the like carbonaceous materials, which coal acids have an average molecular weight of about 250, an average equivalent weight between about 75 and 90, and contain an average of from about 2.5 to 5 carboxylic groups per aromatic nucleus in their molecule and (2) a minor proportion of between about 5 and 50 weight percent, based on the weight of the composition of a cross-linking reagent that is capable of reacting with hydroxyl and amine groups when heated to a resin temperature between about 300° F. and 500° F., said cross-linking reagent being selected from the group consisting of aldehydes, monomethylolurea, dimethylolurea, isocyanates, and mixtures thereof.

10. The mass of claim 9, containing a minor proportion of the resin-providing composition blended with the inert filler substance.

11. The mass of claim 9, containing an amount of the resin providing composition blended with the inert filler substance that is adapted to provide between about 2 and 15 percent by weight of resin binder in the mass when it is cured.

12. A mass in accordance with that set forth in claim 11 wherein the inert, silicious filler substance is glass fibers.

13. A mass in accordance with that set forth in claim 11 wherein the inert, silicious filler substance is sand.

References Cited in the file of this patent
UNITED STATES PATENTS

| | | |
|---|---|---|
| 2,149,286 | Graves | Mar. 7, 1939 |
| 2,275,008 | Coffman | Mar. 3, 1942 |
| 2,333,639 | Christ et al. | Nov. 9, 1943 |
| 2,692,253 | Holmen | Oct. 19, 1954 |
| 2,726,219 | Hill | Dec. 6, 1955 |
| 2,895,934 | Archer et al. | July 21, 1959 |
| 2,895,936 | Archer et al. | July 21, 1959 |